United States Patent [19]

Lamy

[11] 4,107,933
[45] Aug. 22, 1978

[54] APPARATUS AND METHOD FOR TOWING A PIPELINE IN A BODY OF WATER

[75] Inventor: Jacques Edouard Lamy, Fontenay-aux-Roses, France

[73] Assignee: Compagnie Generale pour les Developpements Operationnels des Richesses Sous-Marines "C. G. Doris", Paris, France

[21] Appl. No.: 797,697

[22] Filed: May 17, 1977

[30] Foreign Application Priority Data

Jun. 4, 1976 [FR] France .............................. 76 17023

[51] Int. Cl.² .............................................. F16L 1/00
[52] U.S. Cl. ....................................... 61/107; 61/112; 61/113
[58] Field of Search ................ 61/112, 106, 107, 109, 61/113

[56] References Cited

U.S. PATENT DOCUMENTS 4,011,729  3/1977  Kermel .................................. 61/112

FOREIGN PATENT DOCUMENTS 1,222,669  1/1960  France ........................................ 61/112

*Primary Examiner*—Jacob Shapiro
*Attorney, Agent, or Firm*—Laurence R. Brown

[57] ABSTRACT

An apparatus and method for towing a pipeline in a body of water to a place where the pipeline is to be laid on the bed of the body of water, the pipeline having a positive buoyancy and being provided with trail-ropes distributed therealong which drag on the bed while the pipeline is being towed and maintain it at a certain distance above the bed, wherein some at least of the trail-ropes are connected to the pipeline at points spaced apart therein in such manner that such trail-ropes are formed with arcuate portions extending between the points of attachment to the pipeline so that when said arcuate portions drag upon the bed they are retained substantially parallel to the longitudinal axis of the pipeline thereby to oppose drift by a transverse current, said trail-ropes also optimally comprising means for penetrating the bed so as to offer increased resistance to drift.

17 Claims, 5 Drawing Figures

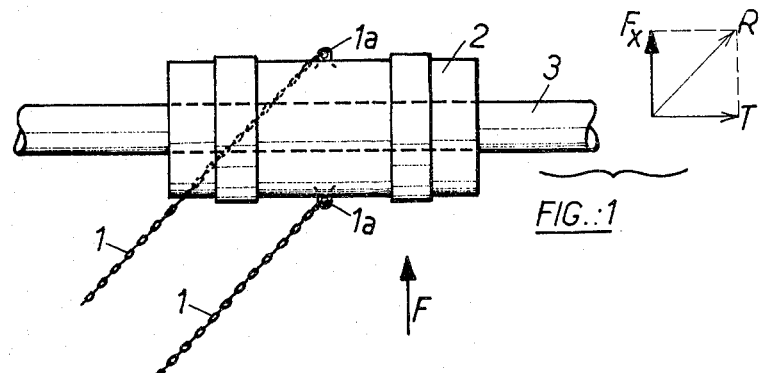
FIG.:1
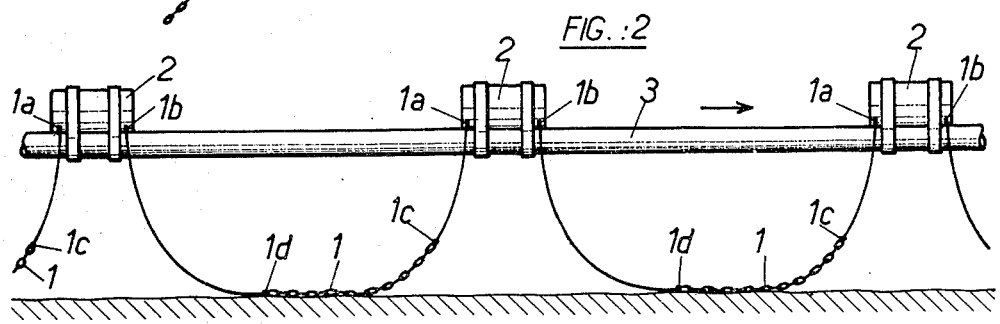
FIG.:2
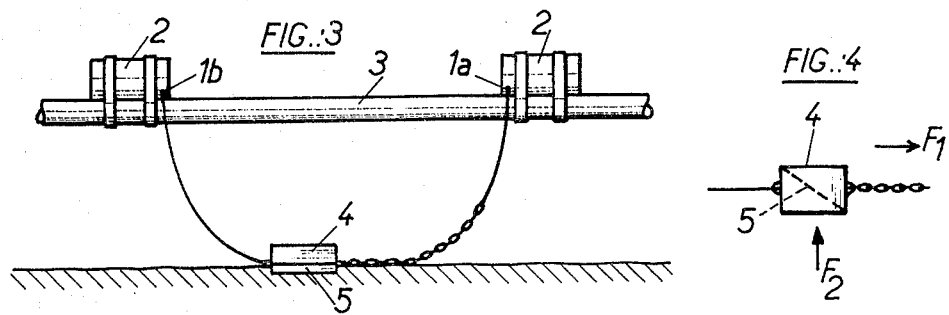
FIG.:3
FIG.:4
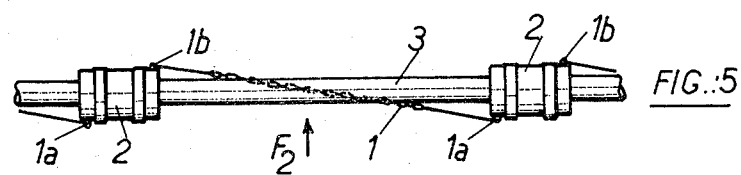
FIG.:5

APPARATUS AND METHOD FOR TOWING A PIPELINE IN A BODY OF WATER

In certain methods of laying pipelines intended to be submerged to the bed of the sea or of a body of water, sections of pipeline of more or less great length, fabricated on the bank, are towed by a boat to the place at which the pipeline is to be placed. In order to avoid very considerable frictional stresses of the pipeline on the bed, it has already been proposed to maintain the pipeline at a certain distance above the bed by providing it with floats which give it a positive buoyancy and with hanging chains giving the assembly a negative buoyancy and acting as a trail-rope when they contact the bed. At that moment, in effect, the weight of the part of the chains which rests on the bed is subtracted from the weight of the assembly.

This method is perfectly satisfactory in the absence of currents having a component perpendicular to the pipeline. But when such currents exist, for example when passing through a strait, they can cause a drift of the pipeline in the course of its displacement, the trail-rope then assuming an oblique position according to the resultant of the pulling force exerted on the pipeline and the hydro-dynamic drag.

The applicant seeks to overcome this drift.

According to the invention, the trail-ropes, or at least some of them, distributed along the pipelines, no longer hang freely under the pipeline but are attached at a further point thereto, so as to form an arc under the pipeline, which are, in rubbing on the bed in the case of transverse displacement, can oppose it better than an ordinary trail-rope.

Various embodiments of the invention will be described hereafter, with reference to the attached drawings given by way of non-limiting examples.

FIG. 1 is a schematic view, in horizontal projection, showing the oblique position that ordinary trail-ropes can take up in the presence of a transverse current.

FIG. 2 is a schematic view in elevation on a smaller scale showing a pipeline provided with trail-ropes attached at two points, according to a first embodiment of the invention.

FIG. 3 shows, in elevation, another embodiment and FIG. 4 shows a detail in horizontal projection.

FIG. 5 is a view in horizontal projection showing another method of attaching the trail-ropes.

FIG. 1 shows how ordinary trail-ropes 1, attached at one of their ends to the pipeline, either directly or to floats such as 2 supporting the pipeline 3, position themselves in the presence of a current having a transverse component in the direction of the arrow F. (The figure shows two trail-ropes attached to each float, symetrically on each side of the vertical plane containing the axis of the pipeline, but this disposition is only shown by way of example since it has no relevance to the invention). The trail-ropes, which rest on the bed over a certain length from their free end, take up an oblique direction, following the resultant R of the pulling force T exerted on the pipeline by the tug and the transverse force Fx developed by the current on the assembly of pipeline and floats (hydro-dynamic drag). The resistance of the trail-ropes to the drift by friction on the bed is insufficient when the force of the current reaches a certain value.

In the embodiment of the invention shown in FIG. 2, the trail-ropes 1, instead of hanging freely under the pipeline by attachement thereto, or to a float, at a single point 1a, are attached at a second point 1b, so as to form an arc which hangs as a festoon between the points 1a and 1b, at the moment the pipeline is submerged, when it is still at a sufficient level above the bed that the trail-ropes do not contact the latter.

FIG. 2 shows the system at the equilibrium level of the pipeline, in which the lift given by the floats 2 is balanced by the weight of the part of the trail-ropes which does not rest on the bed.

It will be understood that with this arrangement, the part of the arcs which is in contact with the bed tends to lay to a certain extent parallel to the axis of the pipeline, and exerting a resitance to transverse displacement under the action of a current.

As is known, the effective functioning of the trail-ropes assumes that they present a sufficient mass distributed therealong, which is the case of a metallic chain with sufficiently large links, or again of masses, of concrete, for example, distributed as a necklace along a cable. Naturally, it is not necessary that this distribution of masses should exist over the whole length of an arc between the attachment points 1a and 1b; it suffices that it exists over the useful length and FIG. 2 shows, for each arc, a certain length of heavy chain between the points 1c and 1d, and the rest of the arc, that is to say the lengths between the points 1a and 1c on the one hand, and between the points 1d and 1b on the other hand, could consist of a simple cable. It may also be pointed out that when the pipeline is far from the bottom the dip of an arc is smaller than the height that the part 1a – 1d of each arc would have if this part hung freely vertically under the pipeline. One can thus conveniently proportion the length of chain between the points 1c and 1d, as well as the length of the connections between the points 1a and 1c on the one hand, and 1b and 1d on the other hand, so that the arc has a sufficient curvature to maintain the pipeline at the desired height above the bed.

Numerous variations are possible.

Thus, although FIGS. 2 and 3 show the trail-rope arcs attached to floats, which is convenient to enable the floats and trail-ropes to be released and raised simultaneously when the pipeline has been laid in position and has to be lowered to the bed, it is possible to attach these arcs at one or both ends to points other than the floats by devices releasable from a distance, or even not releasable.

Instead of providing the arrangement of an arc for all the trail-ropes of the pipeline, one could provide them only for certain of the trail-ropes, the others, for example every other trail-rope, hanging freely beneath the pipeline, as in previously known arrangements.

In order to augment resistance to transverse currents, one or more heavy masses 4, of steel or concrete for example, could be fixed to the part of the arcs coming into contact with the bed (FIG. 3). These masses could be provided with a ploughshare 5 which, in penetrating the soil, increases the resistance to drift. In order to ensure that a ploughshare is always in contact with the soil, the masses 4 can be of circular or polygonical section with the ploughshares disposed around them.

In the case of a transverse current of known and constant direction, at least during the operation of towing the pipeline, one could give the ploughshare a certain obliquity so as to generate, during displacement on the bed in the direction of the arrow $F_1$, a reaction opposed to the direction F₂ of the transverse current (FIG. 4).

A similar action could be obtained by attaching the ends of arcs formed by the trail-ropes (points 1a and 1b) alternately to one side and the other of the pipeline.

FIG. 5 shows in plan the arrangement thus obtained, the obliquity of the trailing part of the arc creating a reaction directed in the opposite sense to the direction F₂ of the transverse current.

It goes without saying that the embodiments described have only been given by way of example, and that they could be modified, notably by the substitution of technical equivalents, without departing from the scope of the invention.

I claim:

1. In apparatus for laying a submarine pipeline having a positive buoyancy and equipped with heavy trail-ropes distributed along its length so as to maintain the pipeline a certain distance above the bed of the body of water in which it is towed, the improvements wherein at least some of the trail-ropes are attached to the pipeline at two spaced-apart longitudinal points therealong in such manner that arcs are formed between said attachment points hanging downwardly to present when the pipeline is towed, a part of the trail-ropes which drags on the bottom substantially parallel to the axis of the pipeline in opposition to drift by a transverse current.

2. Apparatus for towing a submarine pipeline in a body of water to a place in which it is to be laid, comprising a pipeline having a positive buoyancy, and heavy trail-ropes distribued along the length of the pipeline and adapted to maintain the pipeline a certain distance above the bed of the body of water in which it is to be towed, opposite ends of some at least of said trail-ropes being attached to the pipeline at two spaced-apart longitudinal points therealong to comprise an arcuate portion between said attachment points hanging downwardly, so that when an intermediate portion drags on the bed when the pipeline is towed, said arcuate portion is maintained substantially parallel to the longitudinal axis of the pipeline in opposition to drift by a transverse current.

3. Apparatus according to claim 2, wherein the portion of the trail-ropes that drags upon the bottom comprises at least one heavy mass.

4. Apparatus according to claim 3, wherein said heavy mass is a steel block.

5. Apparatus according to claim 2, wherein said heavy mass is a concrete block.

6. Apparatus according to claim 2, wherein said trail-ropes have a heavy portion comprising masses distributed therealong and cables connecting said heavy portion to the pipeline.

7. Apparatus according to claim 2, wherein the portion of the trail-ropes that drags on the bed comprises a thin plate adapted to act as a ploughshare so as to penetrate the bed to resist drift.

8. Apparatus according to claim 7, wherein said thin plate is obliquely disposed with respect to the longitudinal axis of the pipeline so that the reaction created when the plate penetrates the bed is in a direction opposite to that of a transverse current.

9. Apparatus according to claim 2, wherein each attached end of at least some of the trail-ropes is attached to the pipeline at points disposed on either side of the vertical plane containing the longitudinal axis of the pipeline so that the trail-rope is obliquely disposed with respect to the longitudinal axis of the pipeline such that the reaction on the bed when the pipeline is towed is in a direction opposite to that of a transverse current.

10. In a method of towing a submarine pipeline in a body of water to a point at which it is to be laid on the bed of a body of water, said pipeline having a positive buoyancy and being equipped with trail-ropes distributed along its length so that the pipeline is maintained a certain distance above the bed with the trail-ropes dragging on the bed, the improvement which comprises attaching at least some of said trail-ropes to the pipeline at two points spaced apart therein so that the part of the trail-ropes that drags on the bed is maintained substantially parallel to the longitudinal axis of the pipeline and thereby resisting drift by a transverse current.

11. A method according to claim 10, which comprises providing the part of the trail-ropes that drags on the bed with at least one heavy mass.

12. A method according to claim 11, wherein said heavy mass is a steel block.

13. A method according to claim 11, wherein said heavy mass is a concrete block.

14. A method according to claim 10, wherein said trail-ropes comprise a portion having heavy masses distributed therealong and wherein said portion is connected to the pipeline by cables.

15. A method according to claim 10, wherein the portion of the trail-ropes that drags on the bed is provided with a thin plate that acts as a ploughshare by penetrating the bed thereby to resist drift.

16. A method according to claim 15, wherein said thin plate is obliquely disposed with respect to the longitudinal axis of the pipeline so that the reaction created when the plate penetrates the bed is in a direction opposite to that of a transverse current.

17. A method according to claim 10, wherein each of at least some of said trail-ropes is attached to the pipeline at points disposed on either side of the vertical plane containing the longitudinal axis of the pipeline so that the trail-rope is obliquely disposed with respect to the longitudinal axis of the pipeline such that the reaction on the bed is in a direction opposite to that of a transverse current.

* * * * *